United States Patent [19]
Nakamura et al.

[11] Patent Number: 5,543,093
[45] Date of Patent: Aug. 6, 1996

[54] INJECTION MOLDING METHOD AND APPARATUS

[75] Inventors: Nobuyuki Nakamura; Masaaki Minamimura; Fumio Shiozawa; Yoshitoshi Yamagiwa, all of Nagano-ken, Japan

[73] Assignee: Nissei Plastic Industrial Co., Ltd., Japan

[21] Appl. No.: 396,341

[22] Filed: Feb. 17, 1995

Related U.S. Application Data

[63] Continuation of Ser. No. 33,028, Mar. 18, 1993, abandoned.

[30] Foreign Application Priority Data

Mar. 19, 1992 [JP] Japan ......................... 4-092449

[51] Int. Cl.⁶ ................................................. B29C 45/77
[52] U.S. Cl. ..................... 264/40.5; 264/328.1; 425/149; 425/555
[58] Field of Search .................... 264/40.1, 40.5, 264/328.1, 328.8, 328.9; 425/147, 149, 150, 555

[56] References Cited

U.S. PATENT DOCUMENTS 4,146,601  3/1979  Bishop .......................... 264/40.1

FOREIGN PATENT DOCUMENTS

| 2566697 | 1/1986 | France ........................... 425/150 |
| 51-19052 | 2/1976 | Japan . |
| 59-165634 | 9/1984 | Japan . |

*Primary Examiner*—Mathieu D. Vargot
*Attorney, Agent, or Firm*—Ostrolenk, Farber, Gerb & Soffen, LLP

[57] ABSTRACT

A method and an apparatus for injection-molding a molten resin wherein any flaw such as warpage, shrinkage or the like does not occur in products having a small thickness when the desired product of injection molded resin is molded by injecting the molten resin into a cavity of an injection molding die. The molten resin is injected into the cavity under proper control with respect to injection speed and pressure, the pressure of the molten resin being temporarily set and reduced to a preset reference value when the cavity is filled with the molten resin, and subsequently, the pressure of the molten resin filled in the cavity is released.

6 Claims, 6 Drawing Sheets

INJECTION MOLDING METHOD AND APPARATUS

This is a continuation of application Ser. No. 08/033,028, filed on Mar. 18, 1993, now abandoned.

BACKGROUND OF THE INVENTION

1. Field of the Invention

The present invention relates to a method and an apparatus for injection-molding a molten resin wherein any flaw such as warpage, shrinkage or the like does not occur in parts having a small thickness when a desired product of injection-molded resin is molded by injecting the molten resin into a cavity of an injection molding die.

2. Background Art

With respect to a conventional injection-molding method, to prevent not only reverse flow of a molten resin filled in a cavity of an injection-molding die, but also to reduce injection pressure of the molten resin to be injected into the cavity, and moreover, to compensate for contraction of the injection-molded product caused as the molten resin is cooled, pressure retaining is performed after the injection-molding die is fully filled with the molten resin. Since the pressure to be retained at that time differs from injection-molded product to injection-molded product, there arises an occasion wherein pressure retaining is controlled by way of multi-stages.

However, when the step of pressure retaining is performed during a conventional injection-molding method, immediately after a molten resin is injected into an injection-molding die, which in turn is fully filled with the molten resin, flaws such as warpage, shrinkage or the like sometimes locally occur in a product of injection-molded resin. This phenomenon can be prevented to some extent by modifying the present geometrical configuration of the injection-molded product or the present design of the cavity gate. However, in the case in an injection-molded product in which the geometrical configuration and gate design are restricted, the conventional injection-molding method does not include any means for preventing warpage and shrinkage from occurring an injection-molded product.

SUMMARY OF THE INVENTION

The present invention has been made in consideration of the foregoing background.

The present invention provides a method and an apparatus for injection-molding a molten resin wherein local occurrences of flaws such as warpage, shrinkage or the like can be prevented in an injection-molded product without any necessity for substantially changing the conventional injection-molding method.

According to one aspect of the present invention, there is provided a method of injection-molding a molten resin wherein the molten resin is injected into a cavity of an injection-molding die under proper control with respect to injection speed and pressure, and subsequently, the pressure of the molten resin in the cavity is retained, wherein a characterizing feature of the method is that the intensity of pressure of the molten resin to be injected into the cavity is temporarily set and reduced to a reference value when the cavity is filled with the molten resin, and thereafter, the pressure of the molten resin in the cavity is released to the outside.

Usually, the setting time for the reference pressure value is within the range of 0.1 to 10 seconds, and this time range is determined depending on various parameters such as the geometrical configuration of the injection-molded product, distribution of a thickness of the injection-molded product, gate design, volume of the mold cavity and so forth.

In addition, according to another aspect of the present invention, there is provided an apparatus for injection-molding a molten resin, wherein a characterizing feature of the present invention is that the apparatus comprises means for detecting whether or not the molten resin is filled in the cavity of to injection-molding die from an injecting unit, means for measuring a preset time in response to a detected signal transmitted from the detecting means, and means for substantially stopping injecting/driving means during the time measurement performed by the time measuring means so as to release the pressure of the molten resin filled in the cavity to the outside.

With the injection-molding apparatus constructed in the above-described manner, energy of the molten resin filled in the cavity is removed from the injection molding die before the step of pressure retaining is performed or at the initial part of the step of pressure retaining and part of the injection-molded product on the downstream side filled ahead in the cavity is promotively cooled, whereby the resin flowable range in the cavity can be narrowed.

After completion of the step of pressure retaining, the molten resin held in the flowable range is solidified under the predetermined pressure. At this time, a quantity of energy required for each injection-molding operation can be reduced compared with a case where the injection-molded resin is solidified after the step of pressure retaining is performed within the wide resin flowable range. Thus, energy required for each injection-molding operation is uniformly consumed for the whole period of injection-molding, resulting in that nominal or zero warpage and shrinkage.

BRIEF DESCRIPTION OF THE DRAWINGS

The present invention is illustrated in the following drawings which show a method and an apparatus for injection-molding a molten resin according to an embodiment of the present invention, in which.

DETAILED DESCRIPTION OF THE PREFERRED EMBODIMENTS

The present invention will now be described in detail hereinafter with reference to the accompanying drawings which illustrate a preferred embodiment thereof.

Figure 1:
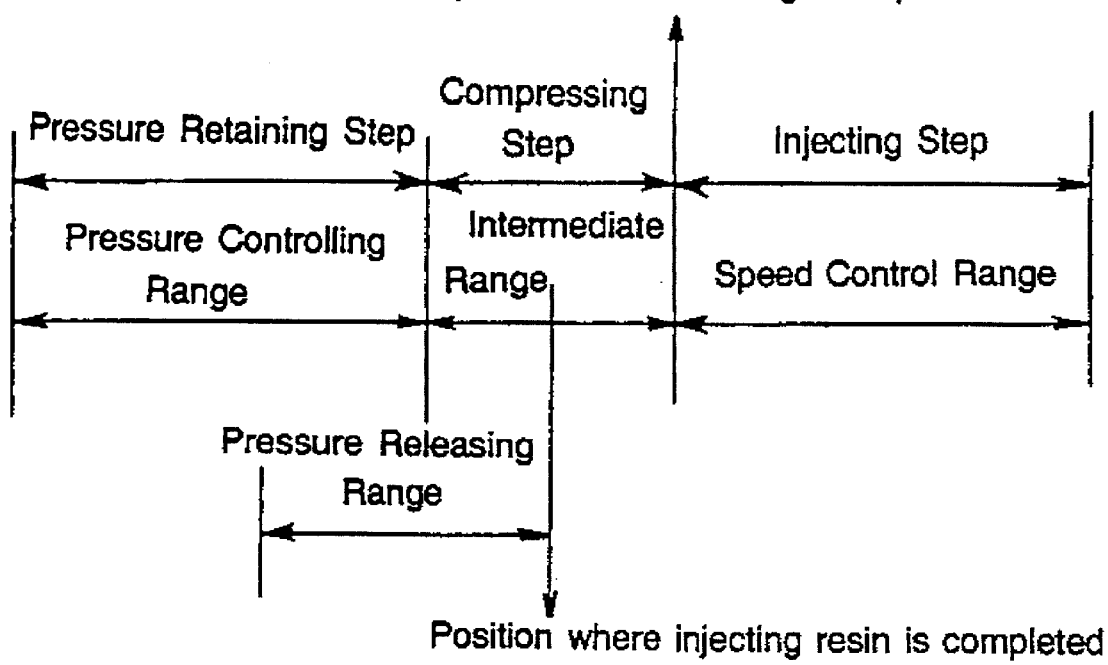
FIG. 1 is an illustrative view which shows a pressure releasing range during a step of injection-molding.
Figure 3:
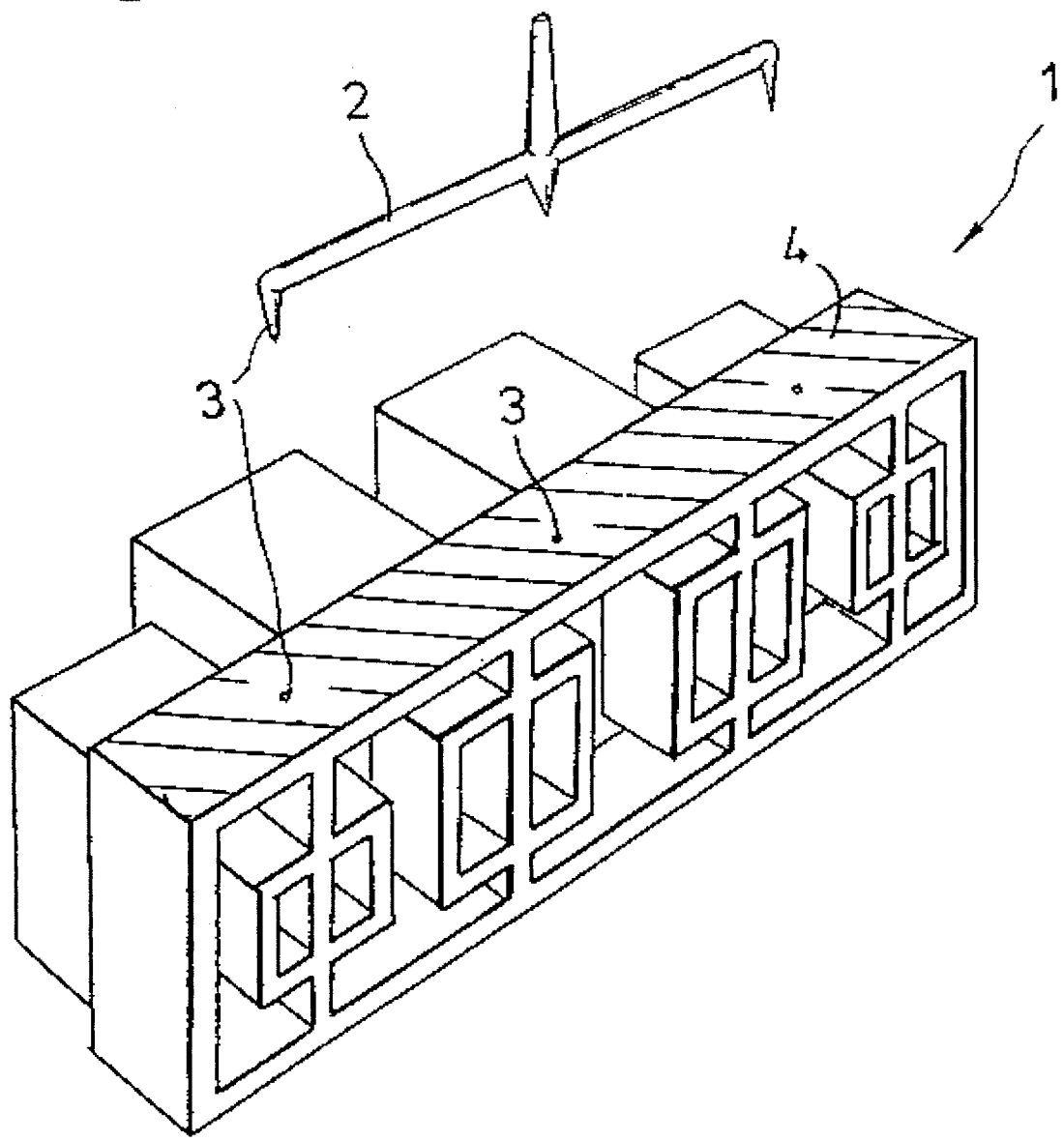
FIG. 3 is a perspective view which off an injection-molded product having a small thickness as well as a runner in the disassembled state.

FIG. 3 is a perspective view of a box-shaped connector which shows by way of example a method of injection-molding a molten resin according to the embodiment of the present invention. The injection-molding method is classified into two types, one being a method in which a pressure retaining step is executed immediately after a resin injecting step and the other one being a method is practiced in which an injecting step is followed by a compressing step and then by a pressure retaining step as shown in FIG. 1. Since each of the foregoing types of injection-molding methods assures that the same advantageous effects can be obtained therewith, the embodiment of the present invention will be described below with respect to the type shown in FIG. 1.

When a box-shaped connector 1 is molded in an injecting step of the method as illustrated in FIG. 1, shrinkage appears in the region represented by a number of hatched lines in FIG. 3. The foregoing region is coincident with a side plate portion 4 which is molded through cavity gates 3, 3 of an injection molding die (not shown) which are communicated with a runner 2 while branching from the same. It is found that as a practical matter it is difficult with the conventional injection-molding method to prevent from the aforementioned shrinkage from occurring during the injection-molding step.

In this embodiment, to form the side plate portion 4, a molten resin is injected through the cavity gates of the cooled injection molding die which is designed such that the side plate portion 4 is located on the cooled gate side. As shown in FIG. 1, a compressing step is executed after completion of an injecting step under speed control, and subsequently, a pressure retaining step is executed under pressure control after completion of the compressing step. Specifically, the compressing step is achieved in the well-balanced state with respect to speed and pressure after speed control is changed to pressure control. After the injection molding die is fully filled with the molten resin, compression of the molten resin in the cavity is controlled under a condition where speed control is automatically changed to pressure control.

Figure 2A:
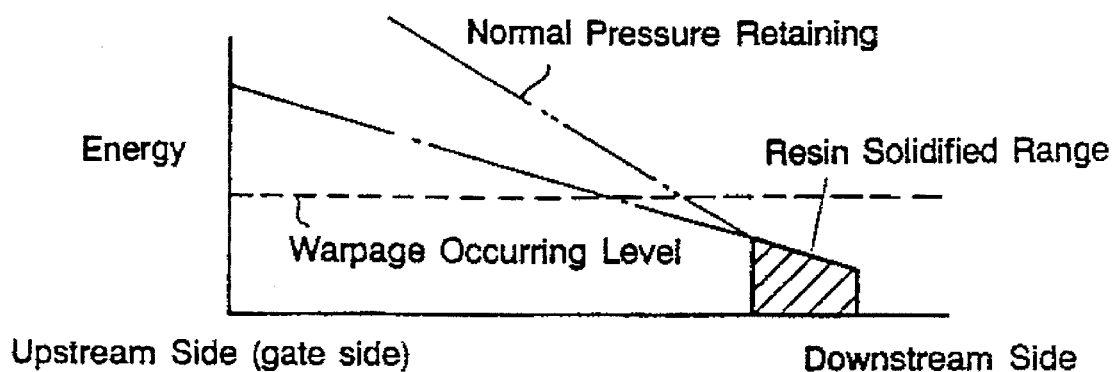
FIGS. 2A, 2B and 2C are diagrams which illustrate the state of injection energy required for the molten resin in a cavity of an injection-molding die.

As shown in FIG. 2A, the molten resin filled in the cavity on the downstream side starts its solidification, but the remaining molten resin is kept still flowable with the exception of the range where the molten resin comes in contact with the inner wall surface of the cavity. Thus, an intensity of energy of the molten resin stored in the cavity on the upstream side where a gate is disposed is kept higher than that of energy of the molten resin stored on the downstream side.

When the molten resin is kept in the pressure retaining state in the conventional manner under the foregoing condition, the molten resin is fully solidified over the whole range extending from the downstream side to the upstream side while the energy-balanced state is left unchanged. At this time, since the present intensity of energy of the molten resin largely exceeds a warpage occurring level, there arises a malfunction that warpage readily occurs in a product of injection-molded resin.

Figure 2B:
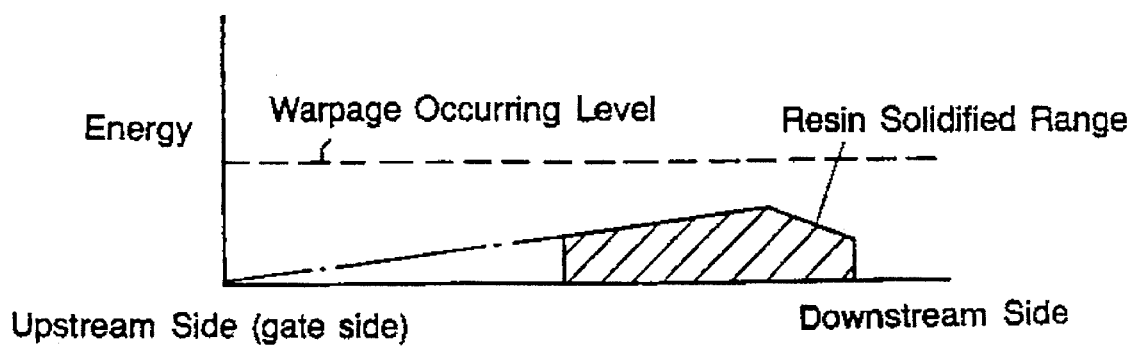

To cope with the foregoing malfunction, when a measure is taken such that an intensity of pressure is set and reduced to a reference value, when the cavity is filled with the molten resin, and subsequently, pressure is released from the molten resin, after the foregoing pressure state is maintained for a predetermined period of time, i.e., the influence of injection-molding pressure is eliminated in the range extending from the intermediate part of a compressing step to a pressure retaining step as shown in FIG. 1, the result is that the intensity of energy of the molten resin stored in the flowable range is released in excess of the warpage occurring level and the molten resin on the downstream side is solidified, resulting in the flowable range being narrowed further as shown in FIG. 2B.

Figure 2C:
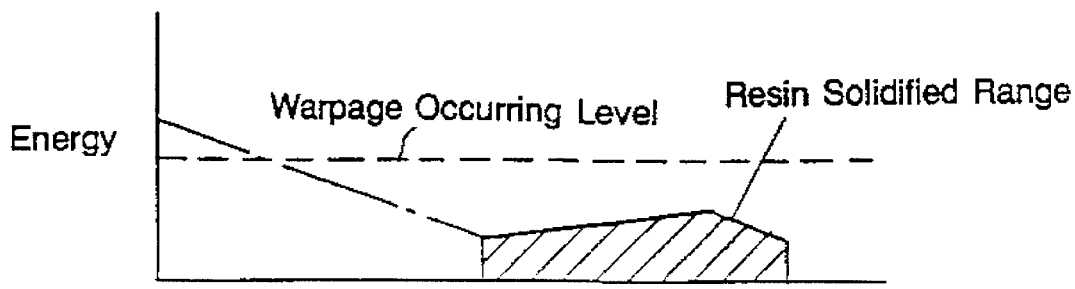

When pressure subsequently is retained, in a manner similar to the conventional manner, after the pressure releasing time elapses, energy is given only to the flowable range, which has been narrowed as described above. Thus, even when an intensity of energy of the molten resin exceeds the warpage occurring level, the flowable range is small compared with the whole range as shown in FIG. 2C.

Consequently, the intensity of energy of the molten range in the cavity can be lowered compared with the case where the molten resin is solidified while pressure is retained in the wide flowable range. In addition, the energy stored in the product of injection-molded resin is uniformly distributed over the whole range, resulting in warpage and shrinkage hardly occurring.

Figure 6:
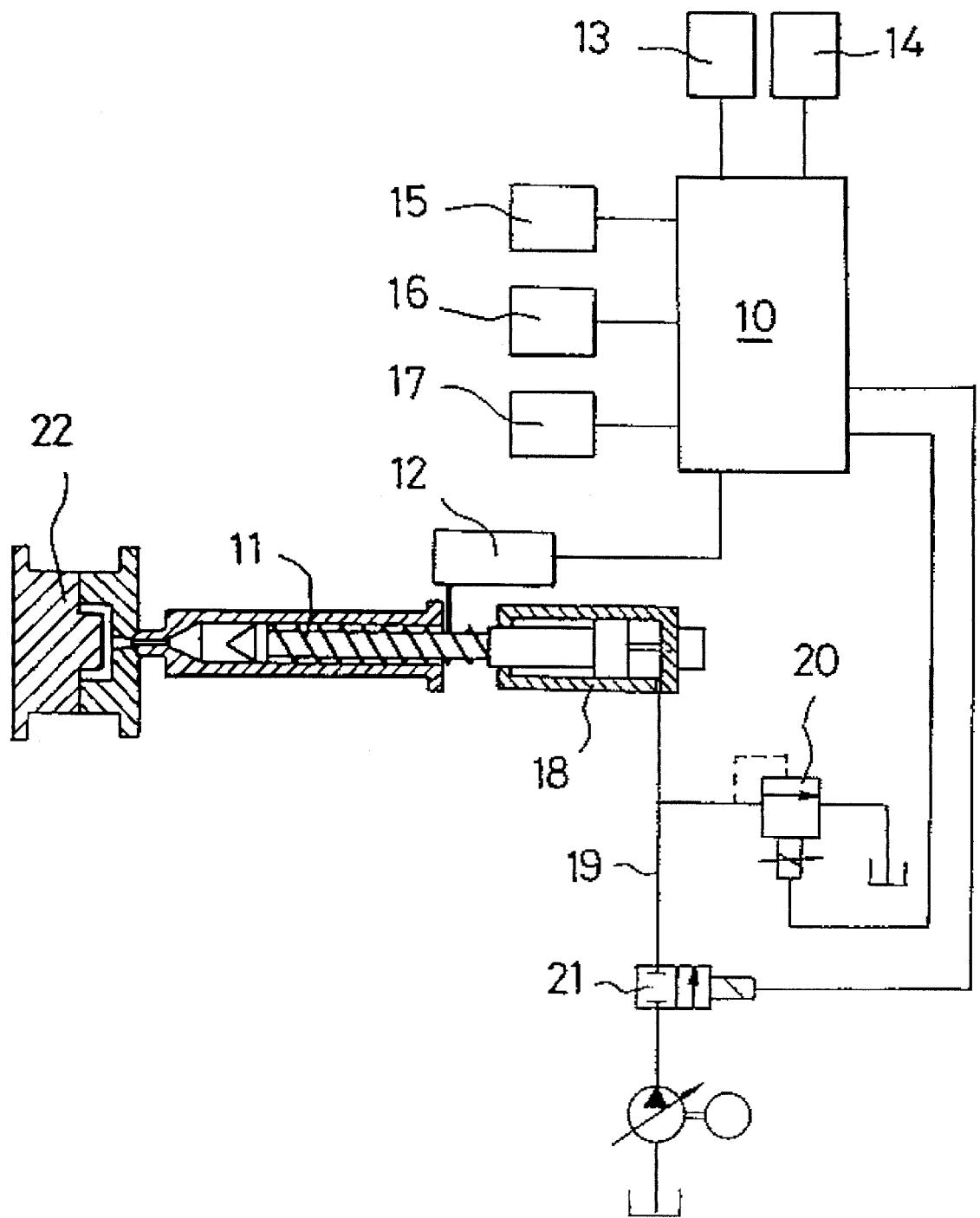
FIG. 6 is a block diagram which schematically illustrates the injection-molding apparatus constructed according to the present invention.

FIG. 6 is a block diagram which schematically shows by way of example an injection-molding apparatus constructed according to the present invention. In the drawing, reference numeral 10 designates a central controller. The central controller 10 is electrically connected to a position detecting unit 12 for detecting the position of by a screw 11 in a heating sleeve, a position setting unit 13 for setting the position of the screw 11, a speed setting unit 14, a pressure setting unit 15, a timer 16 and a reference pressure setting unit 17, so that a control valve 20 and a switch valve 21 disposed in a hydraulic circuit 19 for an injecting actuator 18 are properly controlled with the aid of the detecting unit 12 and the setting units 13, 14, 15, 17 as mentioned above, so as to detect the time when a molten resin is fully filled in a cavity of the injection-molding die. Upon detection of the foregoing time, the central controller 10 to operates such that an intensity of pressure of the molten resin is temporarily set and reduced to a reference value so as to allow the pressure of the molten resin filled in the cavity to be released.

To detect whether or not the molten resin is fully filled in the injection-molding die, values derived from measurements conducted for screw position, injection pressure, pressure in the injection nozzle and pressure in the cavity are compared with preset values. On the other hand, to release the pressure of the molten resin, a measure is taken such that no command signal is transmitted the injecting/driving means or command values for pressure and torque are reduced to zero.

A time measuring function of a microcomputer for the central controller 10 may be used as time measuring means in addition to a timer.

Figure 4:
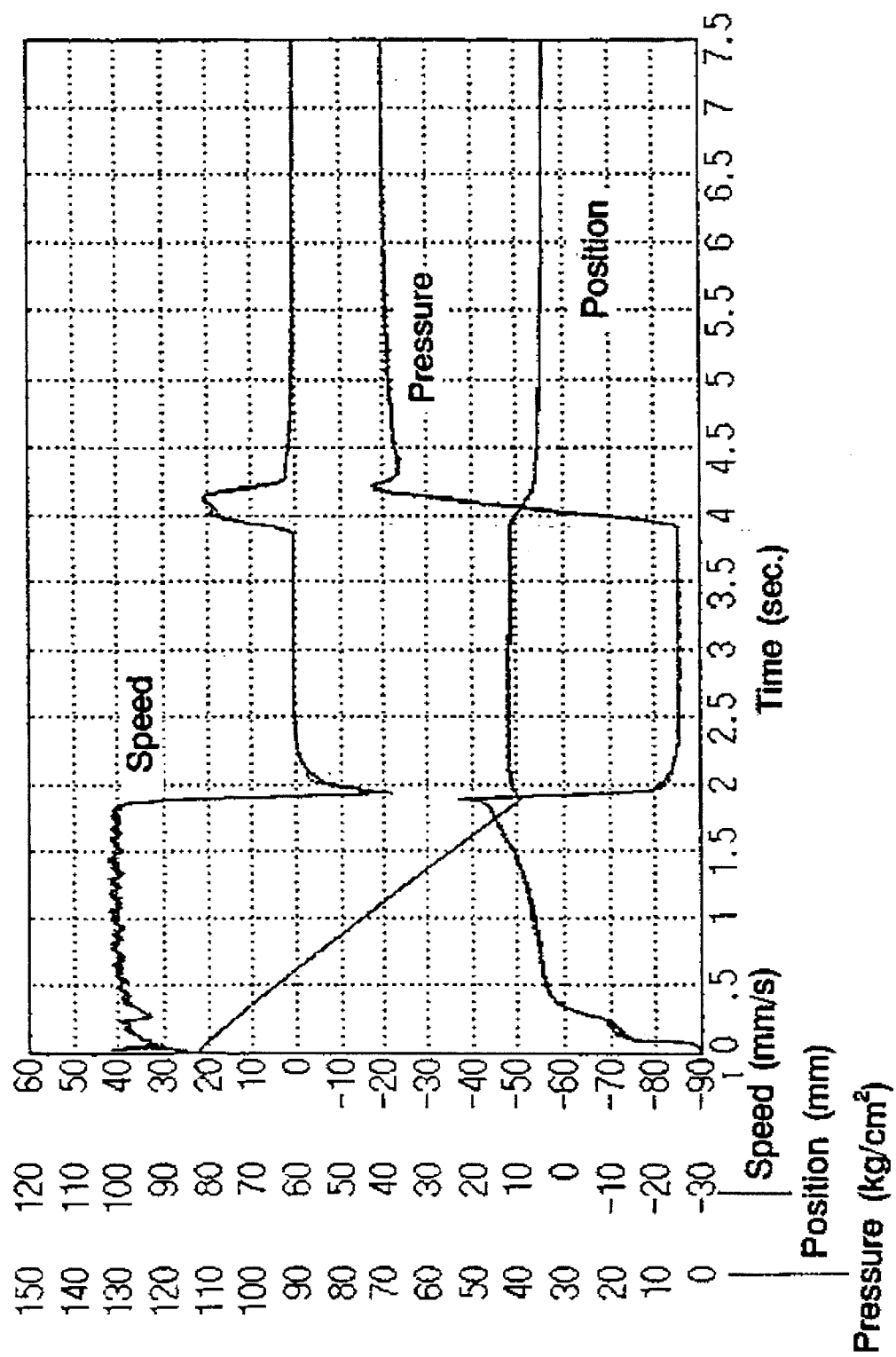
FIG. 4 is a wave profile data diagram which illustrates the operative state of an injection-molding apparatus of the present invention during practical injection-molding.
Figure 5:
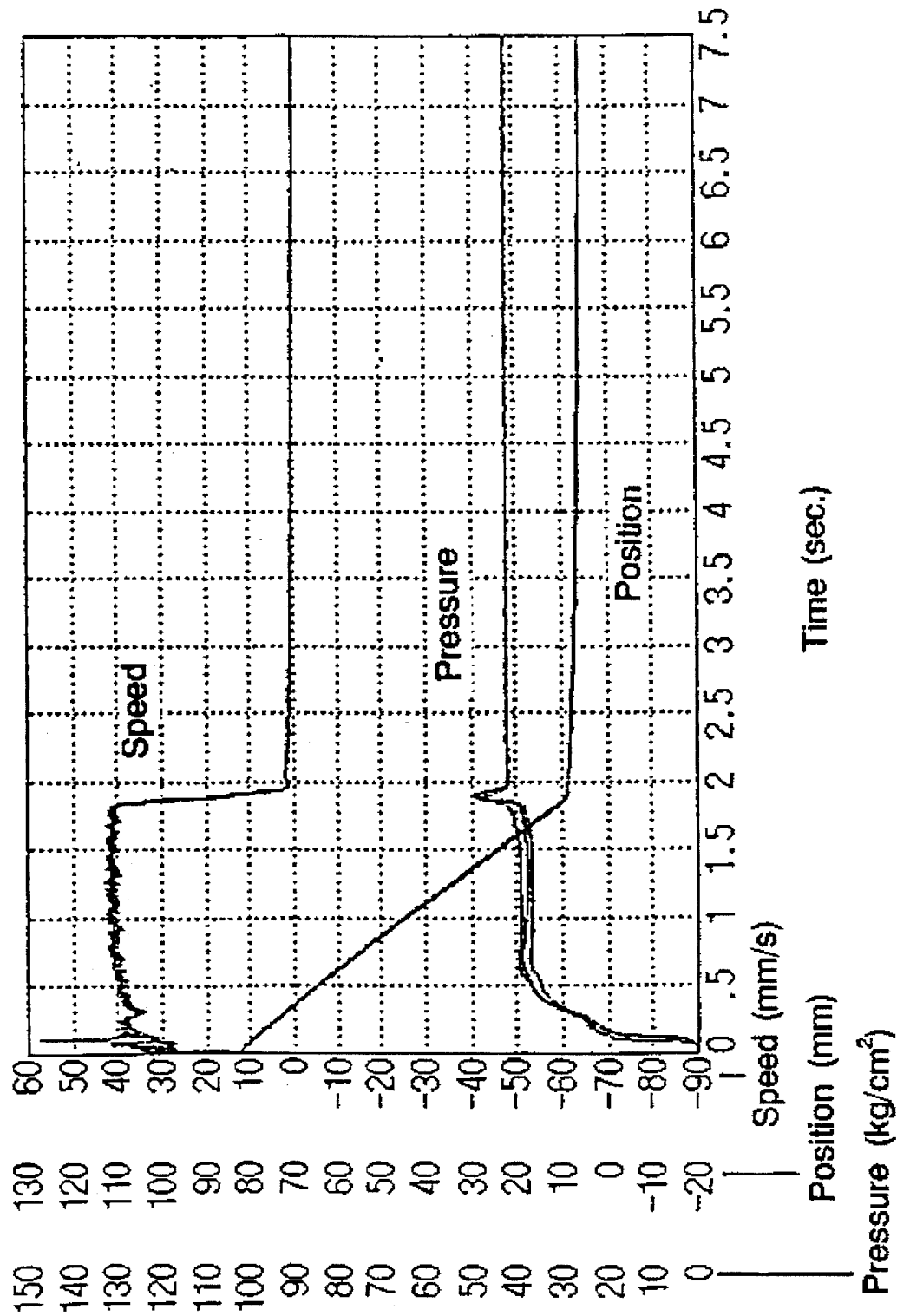
FIG. 5 is a wave profile data diagram which illustrates the operative state of a conventional injection-molding apparatus during practical injection-molding under operative conditions that are determined so as not to allow any warpage to occur with an injection-molded product molded by employing a single speed-two pressure molding process.

FIG. 4 and FIG. 5 are wave profile data diagrams for speed, pressure and screw position, which represent the operative state of the injection-molding machine during practical injection-molding operation with the injection molding start time as a reference point. FIG. 4 is a wave profile data diagram obtained from the injection-molding apparatus constructed according to the above-described embodiment of the present invention, and FIG. 5 is a wave profile data diagram the operative conditions are preset for a conventional injection-molding, such that a low intensity of pressure is used for the whole range so as not to allow any warpage to occur during the usual injection-molding operation having a single-speed, two-pressure process employed therefor.

In the prior art as shown in FIG. 5, after completion of injection (about 2 seconds in FIG. 5), the injection operation is changed from velocity controlling to pressure controlling and a pressure retaining step is carried out at a predetermined retaining pressure. At the pressure retaining step, the pressure is maintained for compensating an amount of shrunk resin within the cavity. Accordingly, in a conventional method as shown in FIG. 5, the set pressure value for the pressure retaining step is a value where the pressure within the cavity is not released out.

In contrast, according to the present invention as shown in FIG. 4, after completion of injection, the pressure value for the pressure is set to zero (which does not directly correspond to an actual value because of other factors, i.e., frictional force of screw, etc.) and thereby the inner pressure within the cavity is released out. In FIG. 4, the actual retaining pressure is 5 kg/cm² which is very low and thus is not used in the conventional prior art method.

It is found from the results derived from analyzing a box-shaped connector injection-molded by operating the injection-molding apparatus constructed according to the embodiment of the present invention as represented by FIG. 4 that pressure fluctuates remarkably during the entire injection-molding operation, a small shearing stress appears in the product of injection-molded resin although the final value of a volumetric contraction rate is kept low, and moreover, warpage is hardly recognized with the product of injection-molded resin.

On the contrary, with the conventional injection-molding apparatus represented by FIG. 5, the final volumetric contraction rate is kept high and no improvement is recognized with respect to warpage of the product of injection-molded resin.

Some conventional injection-molding apparatus are constructed by employing a multi-stage pressure retaining control process such that a first pressure retaining step is controlled at a low pressure. However, since energy is given from the conventional injection-molding apparatus at a low pressure but no energy is later removed therefrom, the product of injection-molded resin is cooled at a slow rate and no improvement is recognized with respect to the occurrence of warpage and shrinkage.

As is apparent from the aforementioned comparison, with the injection-molding apparatus constructed according to the embodiment of the present invention, such that the pressure of a molten resin filled in the cavity is released when the cavity is filled with the molten resin, an occurrence of warpage and shrinkage in a product of injection-molded resin can be reliably prevented, and moreover, an injection-molding operation can be performed without any occurrence of warpage and shrinkage, even when a product of injection-molded resin is restrictively designed in respect of a geometrical configuration and gate design.

Since no special means is required for the injection molding-method of the present invention, with the exception that the intensity of pressure is set and reduced to a reference value when the cavity is filled with the molten resin, the injection-molding method of the present invention can be utilized for a conventional injection-molding operation as is. Consequently, a remarkable industrial advantage can be obtained according to the present invention.

What is claimed is:

1. A method of injection-molding a molten resin, comprising the steps of:

injecting said molten resin into a cavity of an injection-molding die from an upstream side to a downstream side while controlling an injection speed and an injection pressure of said molten resin;

releasing the injection pressure of said molten resin in said cavity by setting the pressure of said molten resin to a reference value below a retaining value pressure when said cavity is filled with said molten resin;

maintaining the pressure of said molten resin at said reference value for a predetermined time;

allowing a downstream portion of said molten resin to solidify during said predetermined time, while said molten resin on said upstream side remains flowable;

increasing the pressure of said molten resin to said retaining value; and allowing said molten resin on said upstream side to harden at said retaining value pressure.

2. The method according to claim 1, wherein the predetermined time for the reference pressure value is within the range of 0.1 to 10 seconds, the range depending upon the geometrical configuration of an injection-molded product, distribution of a thickness of said injection-molded product, gate design, or volume of said cavity.

3. An apparatus for injection-molding a molten resin, comprising:

means for detecting whether a cavity of an injection-molding die is filled with said molten resin, an injecting unit for injecting said molten resin into the cavity from an upstream side to a downstream side;

means for measuring a preset time in response to a detected signal transmitted from said detecting means;

means for setting the pressure of said molten resin to a reference value below a retaining value pressure when said cavity is filled with said molten resin and for allowing a downstream portion of said molten resin to solidify, while said molten resin on said upstream side remains flowable;

means for stopping injection of said molten resin during the preset time determined by said time measuring means so as to maintain the pressure of the molten resin in said cavity at the reference value; and means for retaining said molten resin at the retaining value pressure while said molten resin on said upstream side hardens.

4. The method of claim 1, wherein said reference value is approximately 5 kg/cm².

5. A method of injection-molding a molten resin comprising the steps of:

injecting said molten resin into a cavity of an injection-molding die from an upstream side to a downstream side while controlling an injection speed of said molten resin to form an injected molten resin, said injected molten resin having a flowable range and an injection pressure;

releasing the injection pressure of said injected molten resin to a reference pressure when said cavity is filled with said injected molten resin;

narrowing said flowable range of said injected molten resin by maintaining the pressure of said molten resin at said reference pressure for a predetermined time to promotively cool and solidify a downstream portion of said injected molten resin, while said molten resin on said upstream side remains flowable;

increasing the pressure of said upstream remainder of said injected molten resin to a retaining pressure above said reference pressure; and allowing of said injected molten resin on said upstream side to harden at said retaining pressure.

6. The method of claim 5, wherein said reference pressure is 5 kg/cm².

\* \* \* \* \*